United States Patent [19]

Lajara et al.

[11] Patent Number: 5,192,143
[45] Date of Patent: Mar. 9, 1993

[54] QUICK CONNECT MODULAR UNIT RETAINER ASSEMBLY WITH DAMPING

[75] Inventors: Robert J. Lajara, San Jose; Steven J. Furuta, Santa Clara; Vincent P. Hileman, San Jose, all of Calif.

[73] Assignee: Sun Microsystems, Inc., Mountain View, Calif.

[21] Appl. No.: 883,533

[22] Filed: May 15, 1992

[51] Int. Cl.$^5$ .............................................. F16D 1/00
[52] U.S. Cl. ..................................... 403/24; 403/353; 403/381
[58] Field of Search ........................ 403/353, 381, 24

[56] References Cited

U.S. PATENT DOCUMENTS

| | | | |
|---|---|---|---|
| 3,043,411 | 7/1962 | Wyrough | 403/353 X |
| 4,564,732 | 1/1986 | Lancaster | 403/381 X |
| 5,048,448 | 9/1991 | Yoder | 403/381 X |
| 5,076,723 | 12/1991 | Berger | 403/24 X |

FOREIGN PATENT DOCUMENTS 3842051 12/1989 Fed. Rep. of Germany ...... 403/381

Primary Examiner—Andrew V. Kundrat
Attorney, Agent, or Firm—Blakely Sokoloff Taylor & Zafman

[57] ABSTRACT

A quick connect modular unit retainer assembly for easily installing or removing a modular unit such as a disk drive in a computer housing. Threaded inserts having elastomer sleeves are mounted to the modular unit. The insert assemblies are inserted first vertically, and then horizontally, into L-shaped channels on bosses projecting upward from the computer base. Cooperating fingers extending downward from a pivoted computer cover are maneuvered into the L-shaped channels adjacent to the insert assemblies, thereby locking the insert assemblies, and hence modular unit, into place.

20 Claims, 5 Drawing Sheets

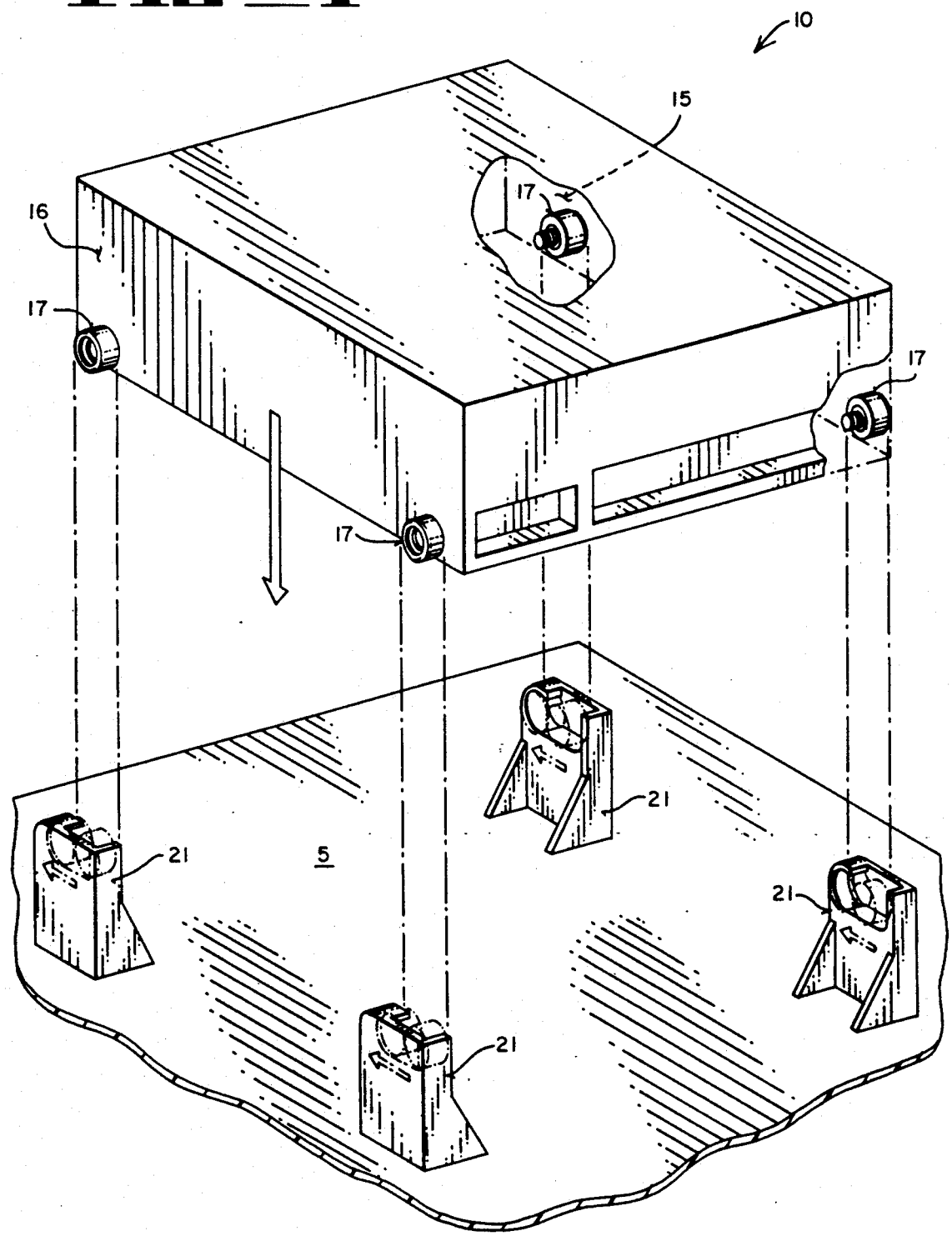
FIG_1

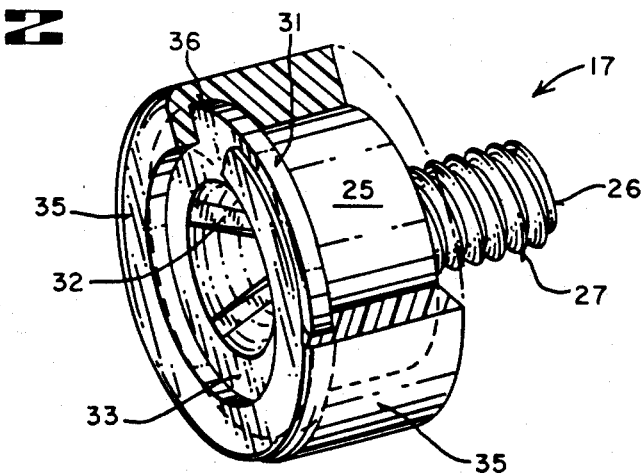
FIG_2
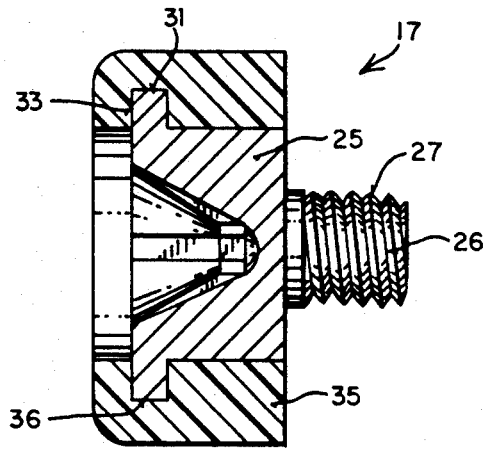
FIG_3A
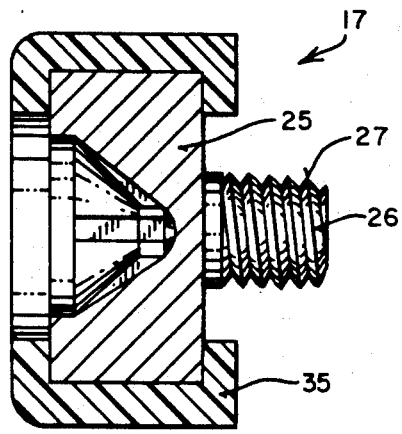
FIG_3B
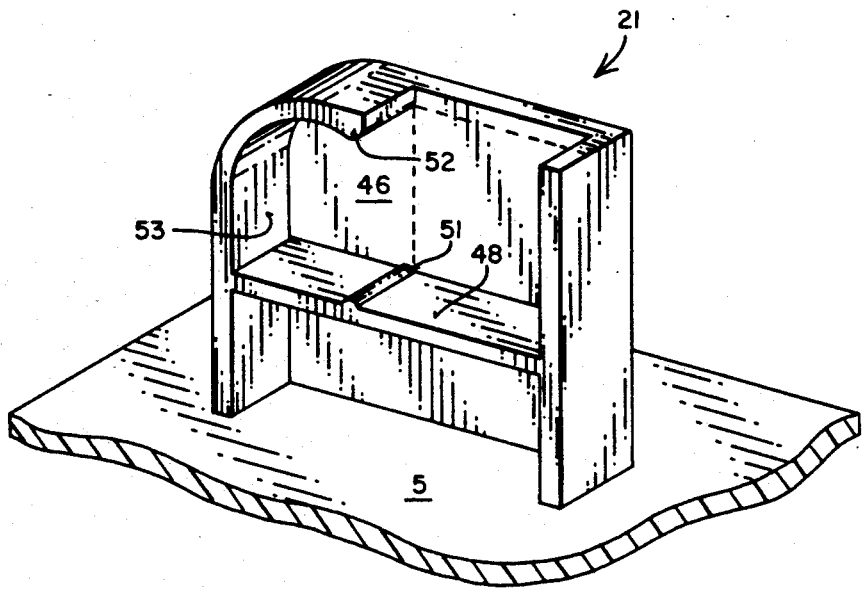
FIG_4

FIG_5A
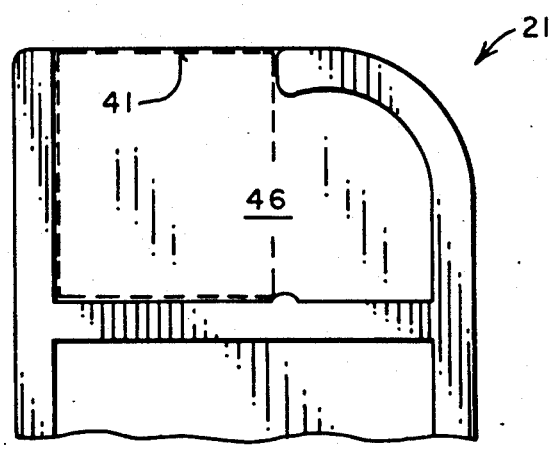
FIG_5B
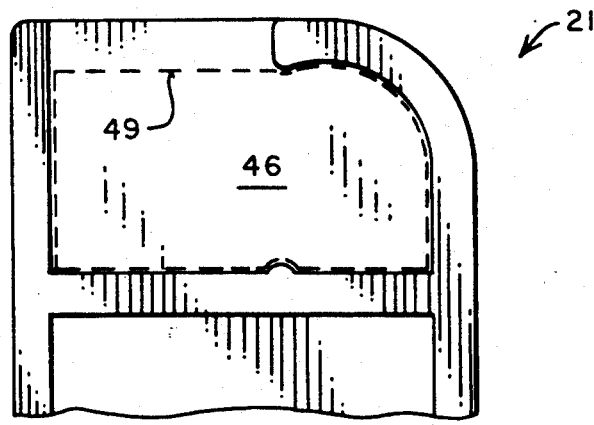
FIG_5C
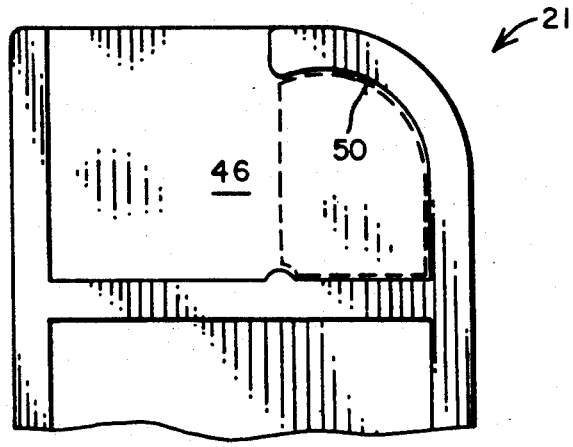

FIG_6
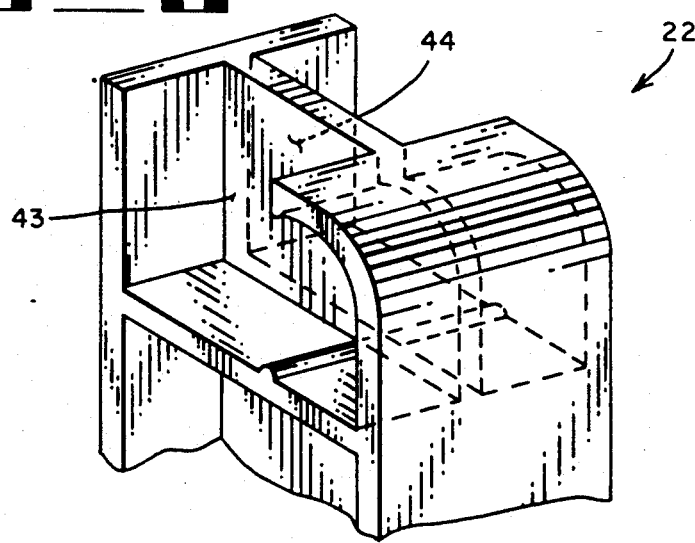
FIG_7A
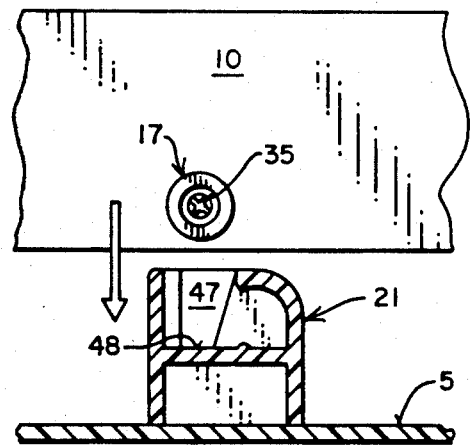
FIG_7B
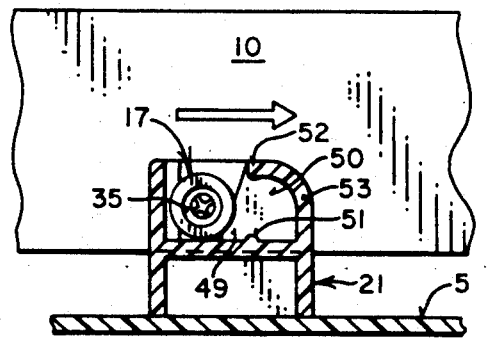
FIG_7C
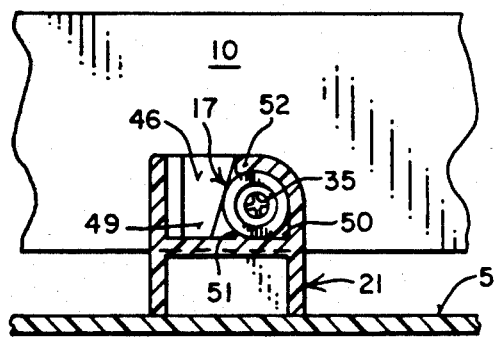

FIG_8A
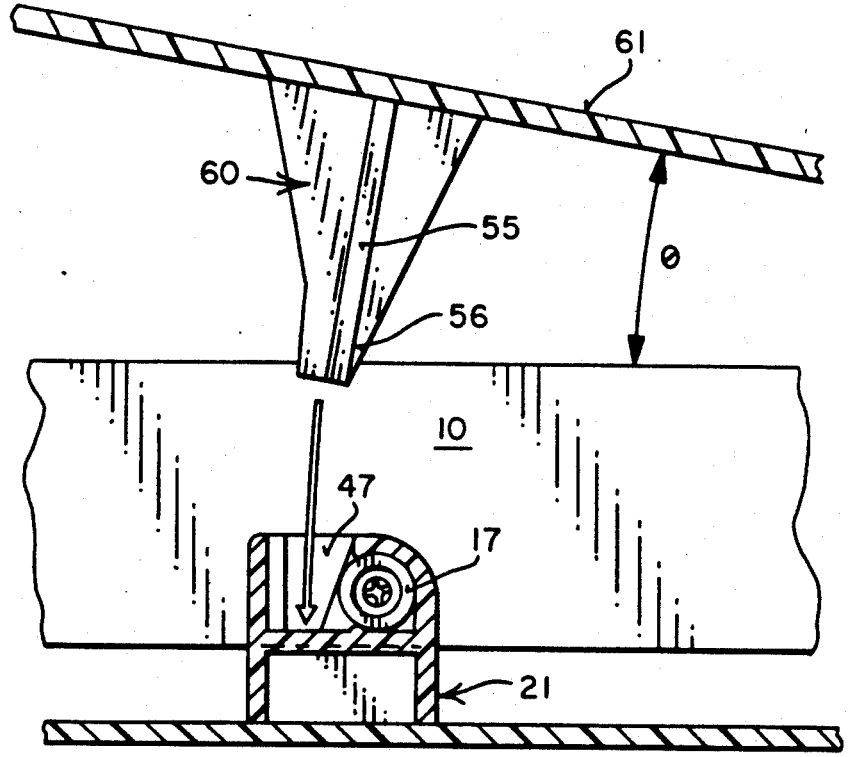
FIG_8B
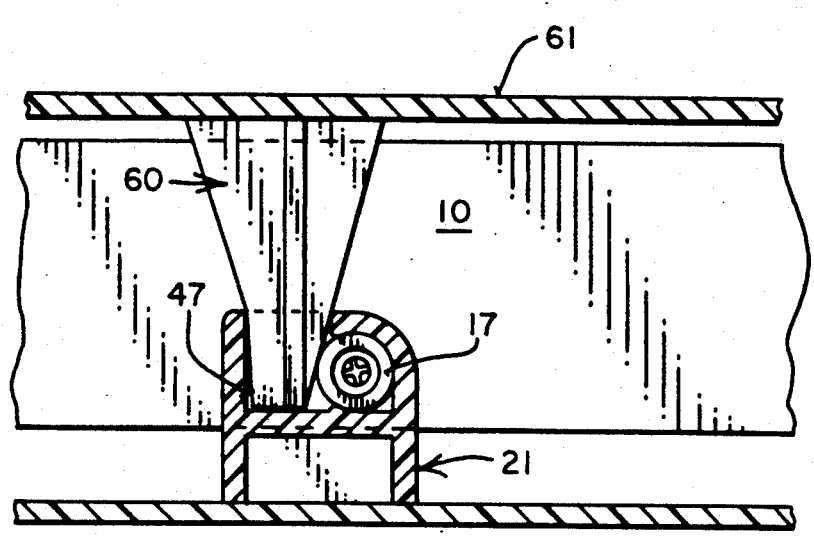

QUICK CONNECT MODULAR UNIT RETAINER ASSEMBLY WITH DAMPING

BACKGROUND OF THE INVENTION

1. Field of the Invention

The present invention relates to computer systems and, more particularly, to apparatus for quickly installing and removing a modular unit within a computer housing.

2. Art Background

It is common to build a computer system with removable modular units such as disk drives. Many techniques exist for physically mounting the modular units inside the computer case.

One common way to mount the modular units to the computer chassis is to fasten metal brackets to the base of the computer with screws or rivets. The modular unit is then fastened to the metal brackets with screws. This mounting method permits the modular units to be removed with a moderate amount of difficulty. However, a tool such as a screwdriver is required to install or remove the modular unit. Furthermore, the modular unit retention is accomplished in a rigid manner thereby providing no isolation of the modular unit from shock or vibration.

Another common method of mounting a modular unit is to provide a plastic or metal bracket that attaches to the bottom of the modular unit with fasteners such as rivets or screws. The modular unit is then slid forward into place in the computer housing where the bracket acts as a clip to retain the modular unit.

SUMMARY OF THE INVENTION

Therefore it is an object of the present invention to provide a retainer assembly for easily physically mounting a modular unit such as a disk drive into a computer housing in a way that the modular unit may be mounted and dismounted quickly.

It is also an object of the present invention to provide a modular unit retainer assembly that increases the field serviceability of a computer with a modular unit because the modular unit may be mounted and dismounted without the use of tools.

It is a further objective to provide a modular unit retainer assembly that isolates the modular unit from shock and vibration.

Additionally, it is an objective to provide a modular unit retainer assembly that is less expensive to manufacture because it uses fewer parts than retainer assemblies found in the prior art.

A physical retainer assembly for easily installing or removing a modular unit, such as a disk drive, in a computer housing is disclosed. Four insert assemblies, consisting of generally cylindrical threaded metal stubs having circumferential elastomer sleeves, are mounted to the modular unit.

The insert assemblies are then first inserted vertically, and then moved horizontally, into L-shaped receiving channels on bosses projecting upward from the computer housing base. The elastomer sleeves of the insert assemblies are made of a compliant material which positively engages each insert assembly within a mated, ridged terminus of the receiving channels on each of the bosses. Opposing ridges of the mated, ridge terminus act as detents for the elastomer sleeve thereby retaining the modular unit in place so that the computer housing may be lifted or tilted, permitting the inspection and testing of the computer with the modular unit in place. Furthermore, the elastomer sleeve is a made from a highly damped material thereby providing superior shock and vibration isolation to the modular unit.

When the pivotally attached computer housing cover is closed, fingers extending downward from the computer cover slide into the horizontal receiving channels of the bosses thereby locking the insert assemblies, and hence modular unit, into place. The fingers and bosses may be molded into the computer cover and base respectively when the cover and base are manufactured. This reduces the number of parts required for the retainer assembly and thereby reduces the cost of the retainer assembly when compared to retainer assemblies known to the prior art.

Accordingly, the present invention provides a quick connect modular retainer assembly, heretofore unknown in the prior art, that does not require the end user to possess any special tools, provides superior shock and vibration isolation to the modular unit, and is inexpensive to manufacture.

BRIEF DESCRIPTION OF THE DRAWINGS

FIG. 1 illustrates a perspective view of a modular unit with insert assemblies and bosses.

FIG. 2 illustrates a perspective view of one embodiment of the insert assembly shown in FIG. 1.

FIG. 3A illustrates a cross sectional side view of the embodiment of the insert assembly shown in FIG. 2.

FIG. 3B illustrates a cross sectional side view of the preferred embodiment of the insert assembly shown in FIG. 1.

FIG. 4 illustrates a perspective view of a boss.

FIG. 5A illustrates a side view of a boss demonstrating the vertical receiving channel.

FIG. 5B illustrates a side view of a boss demonstrating the horizontal receiving channel.

FIG. 5C illustrates a side view of a boss demonstrating the horizontal channel terminus.

FIG. 6 illustrates a perspective view of an alternate embodiment of a boss.

FIG. 7A illustrates vertical insertion of an insert assembly into a vertical receiving channel of a boss during drive installation.

FIG. 7B illustrates horizontal insertion of an insert assembly into a horizontal receiving channel of a boss during drive installation.

FIG. 7C illustrates an insert assembly engaged in a mated ridged terminus of a boss.

FIG. 8A illustrates the insertion of a finger attached to a pivoted cover into the vertical receiving channel of a boss.

FIG. 8B illustrates a finger engaged in the vertical receiving channel of a boss thereby locking a modular unit into place.

DETAILED DESCRIPTION OF THE INVENTION

A quick connect modular unit retainer assembly is disclosed. In the following description, for purposes of explanation, specific quantities, dimensions and materials, etc. are set forth in order to provide a more thorough understanding of the present invention. However, it will be apparent to one skilled in the art that the present invention may be practiced without these specific details.

Referring to FIG. 1, a perspective view of the quick connect retainer assembly is shown wherein a modular unit 10 having insert assemblies 17 and bosses 21 is illustrated. Rectangular modular unit 10, e.g. a computer disk drive, has at least two threaded holes on both right side 15, and left side 16 of the modular unit 10. Threaded holes are laterally separated such that each side 15 and 16 has at least one threaded hole located near the front and at least one threaded hole threaded hole located near the back.

Four identical threaded insert assemblies 17 are fastened to the modular unit 10 by screwing each of the threaded insert assemblies 17 into its corresponding threaded hole. Although the insert assemblies 17 are attached to the modular unit 10 in the present invention by threaded fasteners, it will be appreciated by one skilled in the art that other methods of fastening the insert assemblies to the modular unit may be used.

Referring to FIG. 2, a perspective view of one embodiment of the insert assembly 17 is illustrated. Threaded insert assemblies 17 consist of a threaded metal stub 25 covered by an elastomer sleeve 35. The metal stub 25 is a solid metal cylinder with a nub 26 of lesser radius extending from its lower side. The nub 26 extends concentrically about the vertical axis of the insert, and has threading 27 which permits the metal stub 25 to be screwed into any of the threaded holes in modular unit 10. Additionally, the metal stub 25 has a cylindrical ridge 31 along its top 33 located concentrically about the vertical axis of the insert. The cylindrical ridge 31 is used to positively engage the metal stub 25 into an elastomer sleeve 35. The top 33 of the threaded metal stub contains a Phillips slot 32 having two partial slots crossed at right angles into which a head of a #2 Phillips screwdriver is placed when screwing threaded metal stub 25 into the threaded hole of the modular unit 10. While the present invention uses a Phillips head screwdriver to drive a threaded metal stub 25 into the modular unit 10, it will be appreciated by one skilled in the art that other methods could be used to attach the threaded metal stub 25 to the modular unit 10. The insert assemblies may be fastened to the modular unit by the end user using a #2 Phillips screwdriver. Alternately, the insert assemblies may be supplied attached to the modular unit by the vendor thereby eliminating the need for the end user to possess any special tools.

The elastomer sleeve 35 is a thin-walled cylindrical tube having a groove 36 embedded circumferentially within its inner wall. The groove 36 mates to the ridge 31 along the top 33 of the threaded metal stub 25 when the elastomer sleeve 35 is placed over the threaded metal stub 25, thereby forming insert assembly 17. Referring now to FIG. 3A, a cross sectional side view of one embodiment of the insert assembly 17 is illustrated. Elastomer sleeve 35 is affixed to a threaded metal stub 25 by stretching the elastomer sleeve 35 sufficiently to permit it to slide onto the threaded metal stub 25. When the ridge 31 on the threaded metal stub 25 reaches the groove 36 in the elastomer sleeve 35, the elastomer sleeve 35 returns to its normal cylindrical shape locking the elastomer sleeve 35 onto the threaded metal stub 25. When in place, elastomer sleeve 35 extends beyond the threaded metal stub 25 in every direction except that of the threading 27.

It will be appreciated by one skilled in the art that other methods for attaching the elastomer sleeve 35 can be employed. FIG. 3B illustrates a cross sectional side view of the preferred embodiment of insert assembly 17 which employs an over-mold process well known in the art to attach the elastomer sleeve 35 onto the threaded metal stub 25. In the preferred embodiment of insert assembly 17, there is no cylindrical ridge 31 to engage groove 36 as there is in the embodiment depicted in FIG. 3A. Preferably, in either embodiment of insert assembly 17, the elastomer sleeve 35 is made of a damped material that provides superior shock and vibration isolation of the modular unit 10. In the best mode implementation of the present invention, the elastomer sleeve 35 is made of rubberized material of the C-1000 series manufactured by EAR Specialty Composites Company, Indianapolis, Ind. However, it will be apparent to one skilled in the art that other elastomer materials could be used.

As now will be explained in connection with FIGS. 4-7C, referring back to FIG. 1, the modular unit 10 is then physically mounted to a base 5, which is part of the chassis (not shown) within the computer housing (not shown), by simultaneously sliding the insert assemblies 17 mounted to modular unit 10, first vertically, and then horizontally into at least four bosses 21 which are attached to the base 5.

Referring to FIG. 4, a perspective view of a boss 21 is illustrated. At least two bosses 21 are attached to the inside base 5 of a computer housing (not shown). In the preferred embodiment of the present invention, four bosses 21 are used to retain the modular unit 10 if it is a hard drive and three bosses 21 are used to retain modular unit 10 if it is a floppy drive. Preferably, the bosses 21 are molded into the base 5 of the computer housing (not shown). However it will be obvious to one skilled in the art that the bosses 21 could be attached to the inside of the base 5 by other means.

Moreover, it is anticipated that bosses 21 may be arranged in mirror-image pairs as shown in FIG. 1. Each boss 21 has an "L"-shaped receiving channel 46 which permits an insert assembly 17 to be inserted, first vertically, and then horizontally into the receiving channel 46. The "L"-shaped receiving channel 46 is better described as two connected perpendicular channels. Referring to FIG. 5A, there is a vertical receiving channel 47 that is part of the "L"-shaped receiving channel 46, which receives insert assembly 17 as it is first lowered into boss 21. Referring back to FIG. 4, at the bottom of the vertical channel 47 is a channel wall 48 that delineates where a horizontal receiving channel 49 begins. The horizontal channel 49 is depicted in FIG. 5B. The "L"-shaped receiving channel 46 terminates in a horizontal channel terminus 50, as can be seen in FIG. 5C. Referring back to FIG. 4, the horizontal channel terminus 50 consists of a curved, upwardly extending abutment 53, a lower detent ridge 51 and an upper detent ridge 52 which together retain the insert assembly 17 after insertion.

When mounting a modular unit 10 to base 5, the receiving channel 46 of boss 21 must face the modular unit 10 so that the insert assemblies 17 attached to the modular unit 10 can be placed into the receiving channel 46. Therefore, the four bosses 21 in the best mode implementation of the present invention may consist of two bosses 21 as illustrated in FIG. 4 and two bosses that are mirror images of the boss 21 illustrated in FIGS. 5A-C with the receiving channel 46 located on the opposite side. Alternately, at least two of the four bosses may consist of bosses 22 having two bilateral receiving channels 43-44, as illustrated in FIG. 6, thereby permitting multiple modular units 10 to be compactly mounted within the housing. In this way, bosses 21-22 will be able to receive their corresponding insert assembly 17 when the modular unit 10 is mounted. Because of the symmetric nature of the insert assemblies 17, each insert assembly 17 is interchangeable and can be mounted on either side 15 or 16 of the modular unit 10 without modification.

Referring now to FIGS. 7A-C, insertion of an insert assembly 17 into a boss 21 during drive installation is demonstrated. In FIG. 7A, the rectangular modular unit 10 is held by the installer inside the computer housing (not shown) in such a way that the bottom of the modular unit 10 is parallel with the base 5 of the computer chassis (not shown). Furthermore, the modular unit 10 is positioned by the installer so that each insert assembly 17 mounted on the modular unit 10 is aligned directly above the vertical receiving channel 47 of its corresponding boss 21. The width of the vertical receiving channel 47 is slightly greater than the diameter of the elastomer sleeve 35 on the insert assembly 17, thereby permitting the modular unit 10 to be lowered until each insert assembly 17 reaches the channel wall 48 of its corresponding boss 21.

Referring to FIG. 7B, horizontal insertion of an insert assembly 17 into the horizontal receiving channel 49 of a boss 21 during drive installation is demonstrated. Once each insert assembly 17 rests upon channel wall 48 of the insert assembly's 17 corresponding boss 21, the modular unit 10 is moved horizontally until each insert assembly 17 reaches the horizontal channel terminus 50 of the horizontal receiving channel 49. The horizontal receiving channel 49 has a width slightly less than the diameter of the insert assembly 17. The horizontal receiving channel 49 and horizontal channel terminus 50 having opposing upper and lower detent ridges 52 and 51 together reduce the width of the horizontal receiving channel 49 at one point. The elastomer sleeve 35 of the insert assembly 17 must compress as the insert assembly 17 passes between the upper 52 and lower 51 detent ridges. Once the insert assembly 17 reaches the vertical abutment 53 of horizontal channel terminus 50, the elastomer sleeve 35 expands and resumes its original shape.

Referring now to FIG. 7C, an insert assembly 17 is shown fully engaged in the horizontal channel terminus 50 of a boss 21. In one embodiment of the present invention, the upper 52 and lower 51 detent ridges are placed so that the elastomer sleeve 35 dimensionally conforms to the horizontal channel terminus 50 with a snug fit. Friction between the elastomer sleeve 35 and surfaces of the receiving channel 46 helps to hold the modular unit 10 in place. However, in the preferred embodiment of the present invention, the upper 52 and lower 51 detent ridges, and not the friction, actually retain the insert assembly 17.

It should be noted that a threshold value of sufficient force must be exerted in the horizontal direction to compress the elastomer sleeve 35 when the modular unit 10 is installed or removed. This compression permits the insert assembly 17 to pass between the opposing upper 52 and lower 51 detent ridges of the horizontal receiving channel 49. Once installed, the modular unit 10 will remain in place until a similar threshold force is exerted during removal. The compressibility of the elastomer sleeve 35 of the present invention is chosen such that the threshold force is sufficiently low that one may easily (i.e. by hand) mount or remove the modular unit 10. At the same time, the threshold force is sufficiently great that the modular unit 10 is retained when the computer housing (not shown) is lifted or tilted. In this way, the modular unit 10 can be quickly installed or removed without tools, yet the user may move or invert the computer and the modular unit 10 will remain mounted in place.

Referring to FIGS. 8A-B, the insertion of finger 60 into the vertical receiving channel 47 of boss 21 is illustrated. In FIG. 8A, a side view of a finger 60 is illustrated. The present invention contemplates that there be as many fingers 60 as exist receiving channels 46. In the preferred embodiment, each of four fingers 60 are molded to the top cover 61 of the computer housing (not shown). However, it will be apparent to one skilled in the art that the fingers 60 could be separate units that are attached to the top cover 61 by some other means. The top cover 61, itself, is attached by a pivot (not shown) to the computer housing (not shown).

Each finger 60 has a vertically oriented retention blade 55 which projects perpendicularly from a longitudinal strut 56. The edge of the retention blade 55 is wide enough to hold an insert assembly 17 in the horizontal channel terminus 50 of a boss 21. When the top cover 61 of the computer housing (not shown) is pivoted into the closed position, each finger 60 rests in the vertical receiving channel 47 of its associated boss 21 in a manner whereby the finger 60 obstructs the horizontal receiving channel 49 of the boss 21. This obstruction locks the insert assemblies 17 into place preventing a modular unit 10 attached to the insert assemblies 17 from dislodging.

In this way, the fingers 60 physically lock each insert assembly 17 into the horizontal channel terminus 50 of its corresponding boss 21 when the top cover 61 is closed. The locking action of the fingers 60 permits the computer to be shipped, or otherwise moved, without the possibility that a modular unit 10 mounted within the computer housing (not shown) will dislodge from the quick connect retainer assembly of the present invention. This is especially true if the top cover 61 of the computer housing (not shown) is held in the closed position by any of the many possible fastening systems known in the art.

As the top cover 61 is closed, the finger 60 travels in a circular arc into the vertical receiving channel 47 of boss 21. One edge of the longitudinal strut 56 of the finger 60 has a variation in its taper to permit the strut to fit within the vertical receiving channel 47 of its associated boss 21 as the finger 60 swings down into place on a circular path caused by the pivoting of the top cover 61.

In FIG. 8B, finger 60 is illustrated fully engaged in the vertical receiving channel 47 of a boss 21, thereby locking a modular unit 10 into place. Once the finger 60 is in place, vertical receiving channel 47 is obstructed and insert assembly 17 cannot pass through the vertical receiving channel 47. The computer can thereafter be moved without the modular unit 10 dislodging from the retainer assembly.

The foregoing has described a quick connect modular unit retainer assembly. It is contemplated that changes and modifications may be made by one of ordinary skill in the art to materials and arrangements of the present invention without departing from the spirit and scope of the invention.

What is claimed is:

1. A retainer assembly for securely mounting a modular unit to a base, the retainer assembly comprising:
   a plurality of compliant inserts projecting from the modular unit;
   a plurality of bosses attached to and projecting upward from the base, each boss comprising an "L"-shaped receiving channel embedded in a first vertical surface for slideably receiving the insert corresponding to said boss, the "L"-shaped receiving channel further comprising a vertical channel and a horizontal channel, the vertical channel having an upper and a lower end, the horizontal channel having a terminus and being connected perpendicularly to the lower end of the vertical channel, the upper end of the vertical channel having an opening in the boss, the horizontal channel being narrower than the insert and having an upper and a lower wall, the upper wall having an upper detent ridge disposed opposite a corresponding lower detent ridge disposed in the lower wall, the upper and lower detent ridges located so that the insert is urged against the upper and the lower detent ridges when the insert is positioned in the terminus;
   said vertical channels of said "L"-shaped receiving channels receiving said inserts until the inserts rest upon the lower walls of said horizontal channels, said horizontal channels of said "L"-shaped receiving channels further receiving said inserts between the upper and lower detent ridges until the inserts reach the termini, the compliant inserts compressing when passing the upper and lower detent ridges and then expanding to substantially conform to the termini and securely mounting the modular unit to the base.

2. The retainer assembly as defined in claim 1, wherein the compliant inserts comprise an elastomer material.

3. The retainer assembly as defined in claim 2, wherein the elastomer material has a sufficiently large damping characteristic to isolate the modular unit from shock and vibration when the modular unit is retained by the retainer assembly.

4. The retainer assembly as defined in claim 1, wherein the compliant insert comprises:
   a rigid stub extending from the modular unit; and
   an elastomer sleeve surrounding the rigid stub and longer in length than the stub extends from the modular unit, the elastic sleeve having a cylindrical outer shape and an inner shape conforming to the shape of the stub.

5. The retainer assembly as defined in claim 4, wherein the elastomer sleeve is over-molded onto the rigid stub.

6. The retainer assembly as defined in claim 4, wherein the cylindrical outer shape comprises first and second concentric cylinders, the first cylinder having a radius greater than the radius of the second cylinder of the stub, the second cylinder coupling the stub to the modular unit.

7. The retainer assembly as defined in claim 6, wherein the sleeve has a cylindrical groove embedded concentrically within its inner wall, whereby the sleeve is attached to the stub by stretching the sleeve as the sleeve is placed on the stub until the first cylinder of the stub enters the groove of the sleeve, the sleeve conforming to the shape of the stub and locking the sleeve onto the stub.

8. The retainer assembly as defined in claim 1, wherein said inserts further comprise removable inserts, each insert comprising a threaded nub for threading the insert into a threaded hole in the modular unit.

9. The retainer assembly as defined in claim 1, wherein the bosses are integrally molded into the base.

10. The retainer assembly as defined in claim 1, further comprising
    a plurality of fingers inserted into the vertical channels of the bosses after the modular unit is mounted with the inserts seated in the termini, each finger conforming to the vertical channel of the cooperating boss and physically blocking movement of the insert through the vertical channel thereby preventing the modular unit from dismounting while the finger is engaged in the vertical channel of the boss.

11. The retainer assembly as defined in claim 10, further comprising
    a housing having a cover and a bottom, the bottom of the housing being attached to the base, the cover removably attached to the bottom of the housing, the plurality of fingers attached to and extending from the cover so that the plurality of fingers are positioned in the vertical channels of the bosses when the cover is attached to the bottom.

12. The retainer assembly as defined in claim 11, further comprising a hinging means attaching the cover to the bottom of the housing.

13. The retainer assembly as defined in claim 12 wherein each of the plurality of fingers has a tapered vertical edge such that the width of the finger increases in the direction of the cover;
    whereby, when the cover is closed and engages the vertical channels of the bosses, each of the fingers traverses an arc centered at the hinging means.

14. The retainer assembly as defined in claim 13, further comprising:
    means for securing the cover to the bottom of the housing when the cover is in the closed position;
    whereby the fingers are locked into place in the vertical channels of the bosses when the cover is closed upon the bottom of the housing.

15. The retainer assembly as defined in claim 11, wherein the fingers are integrally molded into the cover.

16. The retainer assembly as defined in claim 1, wherein the plurality of bosses comprise double channel bosses, each double channel boss further having a second vertical surface parallel to the first vertical surface, the double channel boss having a second "L"-shaped receiving channel embedded in the second vertical surface, the second receiving channel further comprising a second vertical channel and a second horizontal channel, the second vertical channel having an upper and a lower end, the second horizontal channel having a second terminus and being connected perpendicularly to the second vertical channel, the upper end of the second vertical channel having a second opening at the top of the double channel boss being wider than an insert of the plurality of inserts the second horizontal channel being narrower than the insert and having second upper and second lower walls, the second upper wall having a second upper detent ridge disposed opposite a corresponding second lower detent ridge disposed in the second lower wall, the second upper and lower detent ridges located so that the insert is urged against the second upper and lower detent ridges when the insert is positioned in the second terminus.

17. A method for securely mounting a modular unit to a base using a quick connect retainer assembly, said method comprising the steps of:
provliding a plurality of compliant inserts projecting from the modular unit;
providing a plurality of bosses attached to and projecting upward from the base;
providing each boss with an "L"-shaped receiving channel embedded in a first vertical surface for receiving the insert corresponding to said boss, the "L"-shaped receiving channel comprising a vertical channel and a horizontal channel, the vertical channel having an upper and a lower end, the horizontal channel having a terminus and being connected perpendicularly to the lower end of the vertical channel, the upper end of the vertical channel having an opening in the boss, the horizontal channel being narrower than the insert and having an upper and a lower wall;
providing an upper detent ridge in said upper wall disposed opposite a corresponding lower detent ridge disposed in the lower wall and locating said upper and lower detent ridges so that the insert is urged against the upper and the lower detent ridges when the insert is positioned in the terminus;
moving the modular unit vertically nearer the base such that the inserts pass through the upper ends of the vertical channels until the inserts rest upon the horizontal walls;
thereafter moving the modular unit horizontally with the inserts passing through the horizontal channels and between the upper and lower detent ridges until the inserts reach the termini;
compressing the compliant inserts when passing the upper and lower detent ridges and then expanding the compliant inserts to substantially conform to the termini and securely mounting the modular unit to the base.

18. The method as defined in claim 17, wherein the method further comprises the step of:
inserting a plurality of fingers into the vertical channels of the bosses, each finger conforming to the vertical channel of the cooperating boss and physically blocking movement of the insert through the vertical channel thereby preventing the modular unit from dismounting while the finger is engaged in the vertical channel of the boss.

19. The method as defined in claim 18, wherein the retainer assembly further comprises a housing having a cover and a bottom, the bottom of the housing being attached to the base, the cover removably attached to the bottom of the housing, the plurality of fingers attached to and extending downwardly from the cover so that the plurality of fingers are positioned in the vertical channels of the bosses when the cover is attached to the bottom, a hinging means attaching the cover to the bottom of the housing, wherein each of the plurality of fingers is tapered such that the width of the finger increases in the direction of the cover, the method further comprising the step of:
closing the cover by rotating the cover about the hinging means towards the bottom of the housing, and, when the cover is closed, engaging the fingers in the vertical channels of the bosses as each of the fingers traverses an arc centered at the hinging means.

20. The method as defined in claim 19, wherein the method further comprises the step of:
using a securing means to secure the cover to the bottom of the housing and lock the fingers into place in the vertical channels of the bosses when the cover is closed upon the bottom of the housing.

* * * * *